United States Patent
Kilian et al.

(10) Patent No.: US 7,617,487 B2
(45) Date of Patent: Nov. 10, 2009

(54) METHOD AND SYSTEM FOR DEBUGGING INDIVIDUAL THREADS IN A PRODUCTIVE ENVIRONMENT

(75) Inventors: Frank Kilian, Mannheim (DE); Jan Dostert, Nußloch (DE)

(73) Assignee: SAP (AG), Walldorf (DE)

( * ) Notice: Subject to any disclaimer, the term of this patent is extended or adjusted under 35 U.S.C. 154(b) by 683 days.

(21) Appl. No.: 11/011,541

(22) Filed: Dec. 13, 2004

(65) Prior Publication Data

US 2006/0143531 A1    Jun. 29, 2006

(51) Int. Cl.
  G06F 9/44      (2006.01)
  G06F 11/00     (2006.01)
(52) U.S. Cl. .............................. 717/127; 714/38; 718/1
(58) Field of Classification Search ........................ None
  See application file for complete search history.

(56) References Cited

U.S. PATENT DOCUMENTS

| | | | |
|---|---|---|---|
| 5,901,315 A | 5/1999 | Edwards et al. | |
| 6,256,752 B1* | 7/2001 | Blandy et al. | 714/38 |
| 6,587,967 B1* | 7/2003 | Bates et al. | 714/35 |
| 6,681,384 B1* | 1/2004 | Bates et al. | 717/129 |
| 6,802,054 B2 | 10/2004 | Faraj | |
| 6,988,662 B2 | 1/2006 | Russell et al. | |
| 2005/0086644 A1* | 4/2005 | Chkodrov et al. | 717/124 |
| 2005/0132338 A1 | 6/2005 | Kalra | |

OTHER PUBLICATIONS

Schulz, Daniel and Frank Mueller, "A Thread-Aware Debugger with an Open Interface," Proceedings of the 2000 ACM SIGSOFT International Symposium on Software Testing and Analysis, Aug. 2000, pp. 201-211.*
Sun Microsystems, *Java Platform Debugger Architecture (JPDA)*, website, Nov. 22, 2004, 1 of 1, http://java.sun.corn/products/jpda.
Sun Microsystems, *Java Platform Debugger Architecture—Example JDI Applications*, website, Nov. 22, 2004, 1 of 1, http://java.sun.com/j2se/1.4.2/docs/guide/jpda/examples.html.
Sun Microsystems, *Java Platform Debugger Architecture*, website, Nov. 22, 2004, 1 of 2, http://java.sun.com/j2se//1.4.2/docs/guide/jpda.
Sun Microsystems, *JPDA Enhancements* website, Nov. 22, 2004, 1 of 4, http://java.sun.com/j2se//1.4.2/docs/guide/jpda/enhancements.html.
Sun Microsystems, *Java Platform Debugger Architecture,Overview*, website, Nov. 22, 2004, 1 of 4, http://java.sun.com/j2se//1.4.2/docs/guide/jpda/jpda.html.
Sun Microsystems, *Java Platform Debugger Architecture, Architecture Overview*, website, Nov. 22, 2004, 1 of 5, http://javasun.com/j2se//1.4.2/docs/guide/jpda/architecture.html.

(Continued)

*Primary Examiner*—Michael J Yigdall
(74) *Attorney, Agent, or Firm*—Blakely, Sokoloff, Taylor & Zafman, LLP

(57) ABSTRACT

A system and method to debug a thread without affecting other threads in a virtual machine. A virtual machine (VM) may execute a thread subject to debugging and another thread. An interface to the VM permits only debugging command that are specific to the thread subject to debugging to affect the VM.

15 Claims, 5 Drawing Sheets

OTHER PUBLICATIONS

Sun Microsystems, *Java Virtual Machine Debug Interface Reference*, website, Nov. 22, 2004, 1 of 59, http://java.sun.com/j2se//1.4.2/docs/guide/jpda/jvmdi-spec.html.

Sun Microsystems, *Java Debug Wire Protocol*, website, Nov. 22, 2004, 1 of 6, http://java.sun.com/j2se//1.4.2/docs/guide/jpda/jdwp-spec.html.

Sun Microsystems, *Java Debug Interface*, website, Nov. 22, 2004, 1 of 2, http://java.sun.com/j2se//1.4.2/docs/guide/jpda/jdi/overview-summary.html.

Sun Microsystems, *Connection and Invocation Details*, website, Nov. 22, 2004, 1 of 9, http://java.sun.com/j2se//1.4.2/docs/guide/jpda/conninv.html.

Chalfant, James, "Dartmouth College Computer Science Technical Report PCS-TR99-346", Dartmouth College, 1999.

Johnson, Mark, "Some Requirements for Architectural Support of Software Debugging", ACM 0-89781-06-4, 1982.

Kilian, Frank, Non-Final Office Action dated Mar. 18, 2009, U.S. Appl. No. 11/011,799, filed Dec. 13, 2004, 19 pgs.

Final Office Action dated Aug. 25, 2008, U.S. Appl. No. 11/011,799, filed Dec. 13, 2004, 20 pgs.

* cited by examiner

METHOD AND SYSTEM FOR DEBUGGING INDIVIDUAL THREADS IN A PRODUCTIVE ENVIRONMENT

BACKGROUND

1. Field

Embodiments of the invention relate to software development. More specifically, embodiments of the invention relate to debugging of software.

2. Background

In the course of software development and/or usage, a bug is said to have occurred in executing code when the behavior of the code is different than expected for the set of inputs. Bugs can vary from catastrophic failure to invalid or anomalous data. In the normal course of operation software code may execute within a virtual machine (VM) that applies a productive interpreter loop to the process statements to execute the code. When code requires debugging, a new VM must be started with a debugging interpreter loop to be applied to the process statements of the code subject to debugging. The debugging interpreter loop provides various tools to facilitate identification and remedy of the bug. However, additional administrative overhead makes a debugging interpreter loop much less efficient than the productive interpreter loop, which would be applied in the normal course. The need to start a new VM and/or restart the existing VM to provide for debugging creates a number of problems. Creation of an additional VM or restarting of existing VM is resource intensive. Moreover, fixing the bug generally requires recreation of the bug. In some cases, this may be difficult or impossible, in the artificially isolated environment of the newly started debugging VM. For example, where the bug is caused by a race condition, loading and behavior of the debugging VM will be different than that of the productive VM, such that reproducing the anomaly may not be possible in the debugging environment.

SUMMARY

A system and method is disclosed to debug a thread without affecting other threads in a virtual machine. A virtual machine (VM) may execute a thread subject to debugging and another thread. An interface to the VM permits only debugging commands that are specific to the thread subject to debugging to affect the VM.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
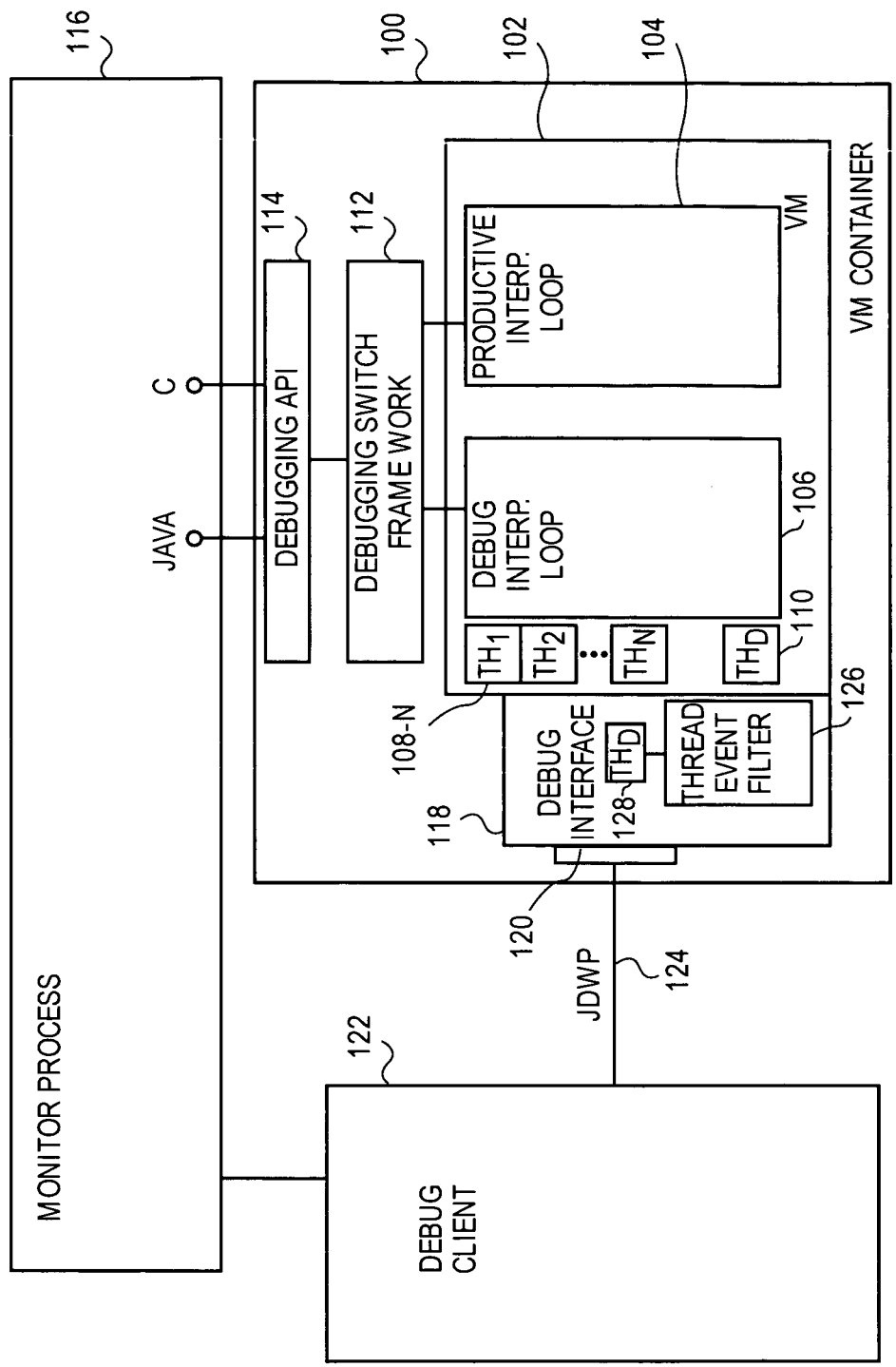
FIG. 1 is a block diagram of a system of one embodiment of the invention.

FIG. 1 is a block diagram of a system of one embodiment of the invention. A VM container (VMC) 100 provides additional features to a VM 102. As used herein, "container" refers to software entity that provides interfaces to other processes and additional services to the entity contained. VM 102 has a productive interpreter loop 104, which provides optimized execution of process statements to which is applied. In a Java environment, the process statements may also be referred to as byte code. A number of threads 108-1 through 108-N may execute on VM 102. In the productive mode, productive interpreter loop 104 is applied to process statements corresponding to each one of these threads 108-1 through 108-N. For short notation, the productive interpreter loop 104 may be said to be applied to the thread.

A debugging interpreter loop 106 may be initialized in parallel when VM 102 is started. The debugging interpreter loop 106 provides various debugging functions on the process statements to which it is applied. Administrative overhead associated with the debugging interpreter loop 106 render it less efficient than productive interpreter loop 104. For example, debugging interpreter loop 106 sends debug events to the remote debug client 122 thereby increasing overhead. In the event there are no threads subject to debugging within VM 102, debugging interpreter loop 106 is suspended.

In the event it becomes desirable to debug a thread, the VM returns from the productive interpreter loop 104 and calls the debug interpreter loop 106, which is then applied to, for example, thread$_D$ 110, the thread subject to debugging. To initiate this switch, VMC 100 provides debugging switch framework 112, which forces a switch to the debugging mode triggered by signaling from debugging API 114. As noted previously, the debugging interpreter loop becomes active in debug mode. Notably, the switch does not require the VM 102 to be restarted or a new VM to be started before debugging can commence. Thus, debugging as possible within the environment in which the bug originally occurred.

Debugging API 114 provides both a Java interface and a C interface through which an external monitor process 116 may initiate the switch. Debugging switch framework 112 also provides port or socket connection information for debug port 120 to permit a debugging client 122 to connect thereto. The VMC 100 also provides a debug interface 118 for VM 102 to facilitate communication between the debugging interpreter loop 106 and the debug client 122. In some embodiments, debug interface 118 may include a thread event filter 126, which may be used to limit the commands accepted from the debug client 122 over channel 124. In one embodiment, acceptable commands are limited to thread specific commands. As used herein, in "thread specific commands" refers to commands that only affect the thread subject to debugging. Commands that affect other threads may be referred to as global commands. Events from application of the debugs interpreter loop 106 are returned over channel 124 to debug client 122.

In some embodiments, the debugging mode may have submodes, such as thread specific debugging and global debugging. Thread specific debugging may also be referred to herein as just "thread debugging." In some embodiments permitting thread debugging, switch framework 112 permits changing from applying the productive interpreter loop 104 to applying the debugging interpreter loop 104 on a thread-by-thread basis. For example, one thread may have the debug interpreter loop applied, while the remaining threads remain in the productive mode. This change in application of the debug interpreter loop and productive interpreter loop may occur while the VM is operational.

In one embodiment, thread event filter 126 causes the debug interface 118 to drop any debug command that is not directed to a thread subject to debugging. In one embodiment, thread event filter 126 identifies if an incoming command affects more than/other than a specific thread subject to debugging. If the command does, the command is dropped. For example, global commands, such as stop VM, would be dropped in thread debugging mode. As used herein, "drop" or formatives thereof mean that the VM does not act on the command. In one embodiment, debug interface 118 includes a data structure 128 that retains a list of threads subject to debugging. In one embodiment, thread event filter 126 accesses the list to determine what commands to drop. Commands not dropped are forwarded by the interface for application to the thread subject to debugging by the debugging interpreter loop 106.

In one embodiment, thread event filter 126 performs package filtering to prevent debugging into special Java packages. For example, package filtering may prevent debugging into a Java 2 Enterprise Edition (J2EE) Engine. An embodiment, in which package filtering is employed, but no thread specific filtering is imposed, is referred to as application debugging. The debugging mode may be initiated by the monitor process 116.

Whether the thread debugging mode, application debugging mode or global debugging mode (generically debugging mode) occurs may be driven by the access rights of the user requesting debugging. This selection may be explicit or implicit. For example, when a user with administrative rights request debugging, the monitor process 116 may default to global debugging, while if a user with less extensive rights request debugging, a default may be thread specific debugging. The use of thread specific debugging permits debugging into a productive execution environment while reducing the risk of interference with another user's code. In another embodiment, thread event filter 126 may filter thread events based on the creator. In such an embodiment, more than on thread created by a single user may be debugged concurrently, but events affecting thread created by a different user would still be dropped.

In one embodiment, debug client 122 communicates over channel 124 to the debugging port 120 using Java Debugging Wire Protocol promulgated by Sun Microsystems of Mountain View, Calif. and available at http://java.sun.com/j2se/1.4.2/docs/guide/jpda/jdwp-spec.html (JDWP). In one embodiment, debug client 122 may be an integrated developer environment (IDE). In another embodiment, debug client 122 may be any external debugger. If the bug, in thread$_D$ 110 is fixed or it otherwise becomes desirable to discontinue debugging, the monitor process 116 may signal the debugging API 114 to trigger a switch back to productive mode through the switch framework 112. In such event, the switch framework 112 will cause the VM to return from the debug interpreter loop 106 and call productive interpreter loop 104 for application to thread$_D$ 110.

Figure 2:
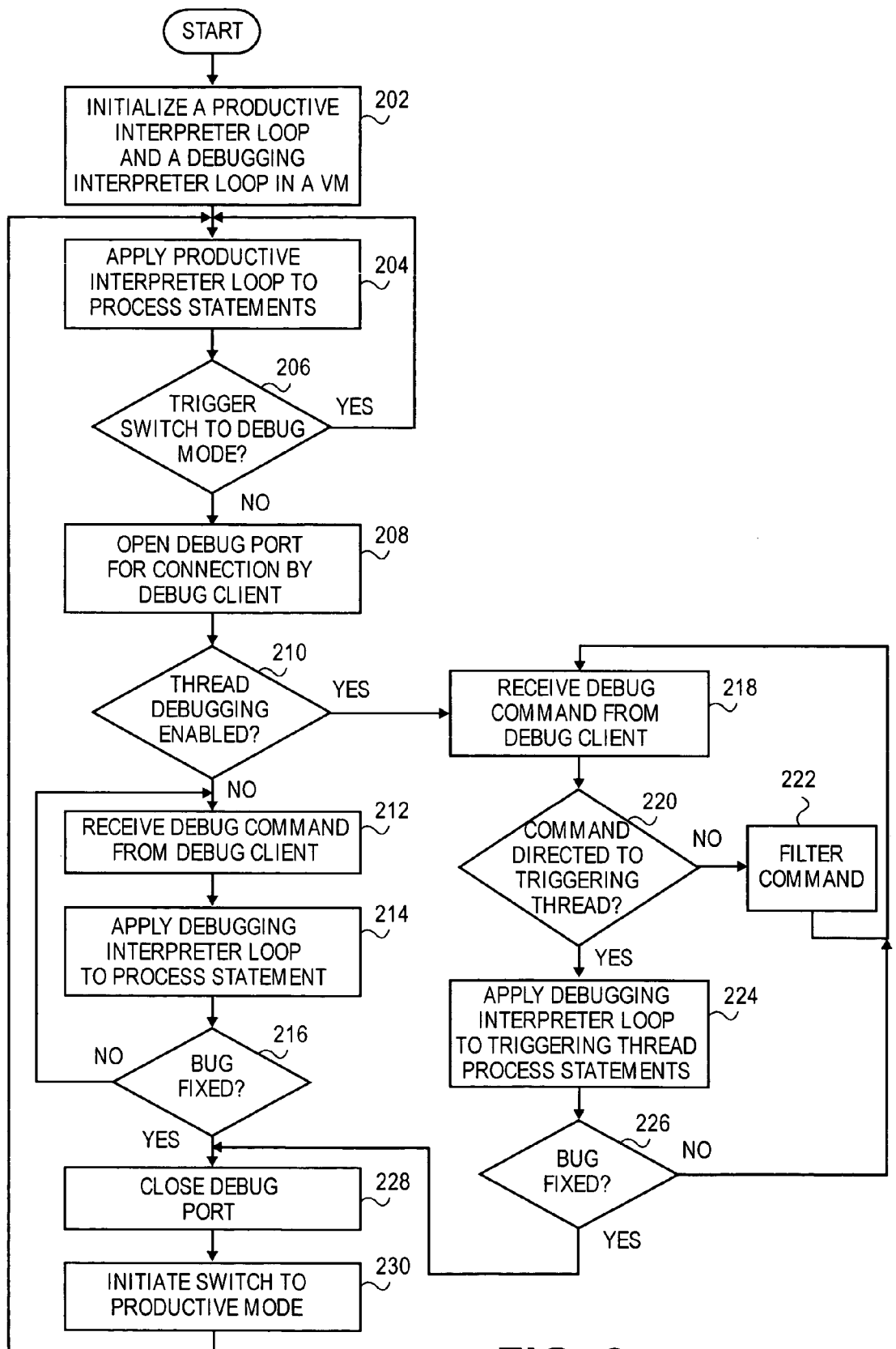
FIG. 2 is a flow diagram of operation in one embodiment of the invention.

FIG. 2 is a flow diagram of operation in one embodiment of the invention. At block 202, a productive interpreter loop and a debugging interpreter loop are initialized in a VM. At block 204, the productive interpreter loop is applied to process statements for a thread executing in the VM. At block 206, a switch to debug mode is triggered in the VM. This triggering may be a result of a user identifying that a bug has occurred. The user may then signal the debugging API to trigger the switch.

Various mechanisms may trigger the switch. In one embodiment, the switch may be triggered by a request from a control process to a host process that hosts the VMC. In another embodiment, a low level stand alone tool may be used to trigger the switch. In another embodiment, VMC administrative servlets could be used to trigger the switch into debug mode. In one embodiment, the Microsoft Management Console (MMC) could trigger the switch. The MMC may provide a popup window interface through which a user may select a debug mode, e.g., global, application, or thread specific. The interface may permit selections of the specific threads to debug. In another embodiment, the triggering may be caused by appending a parameter to a uniform resource locator (URL) sent to the VMC. In such case, the VMC scans received URL's for the presence of the parameter and switches to debug mode if the parameter is present.

At block 208, a debug port is opened to permit connection by debug client. Additionally, the port information is sent to the debug client to permit connection. At decision block 210 a determination is made whether thread debugging is enabled. Thread debugging may not be enabled either because, e.g., global debugging is requested or because the particular embodiment does not support thread debugging.

If thread debugging in not enabled, a command is received from the debug client at block 212. At block 214, the debug interpreter loop is applied to the process statements consistent with the received debug command. A determination is made at decision block 216 if the bug is not fixed. If it is not fixed, a decision to continue to receive debug commands apply the debug interpreter loop at blocks 212 and 214.

If at decision block 210 a determination is made that thread debugging is enabled, commands are received from the debug client at block 218. The determination is made at decision block 220 whether the command is specifically directed to the triggering thread (the thread subject to debugging). If it is not, the command is filtered at block 222. If the command is thread specific, the debugging interpreter loop is applied to the triggering thread process statements consistent with the command. At block 226, a determination is made if the bug is fixed. If the bug is not fixed, the system continues receiving filtering and applying commands at blocks 218 through 224. If the bug is fixed at decision block 216 or 226, the debug port is closed at block 228. At block 230, a system initiates a switch back to productive mode and the productive interpreter loop is applied to the process statements.

Figure 3:
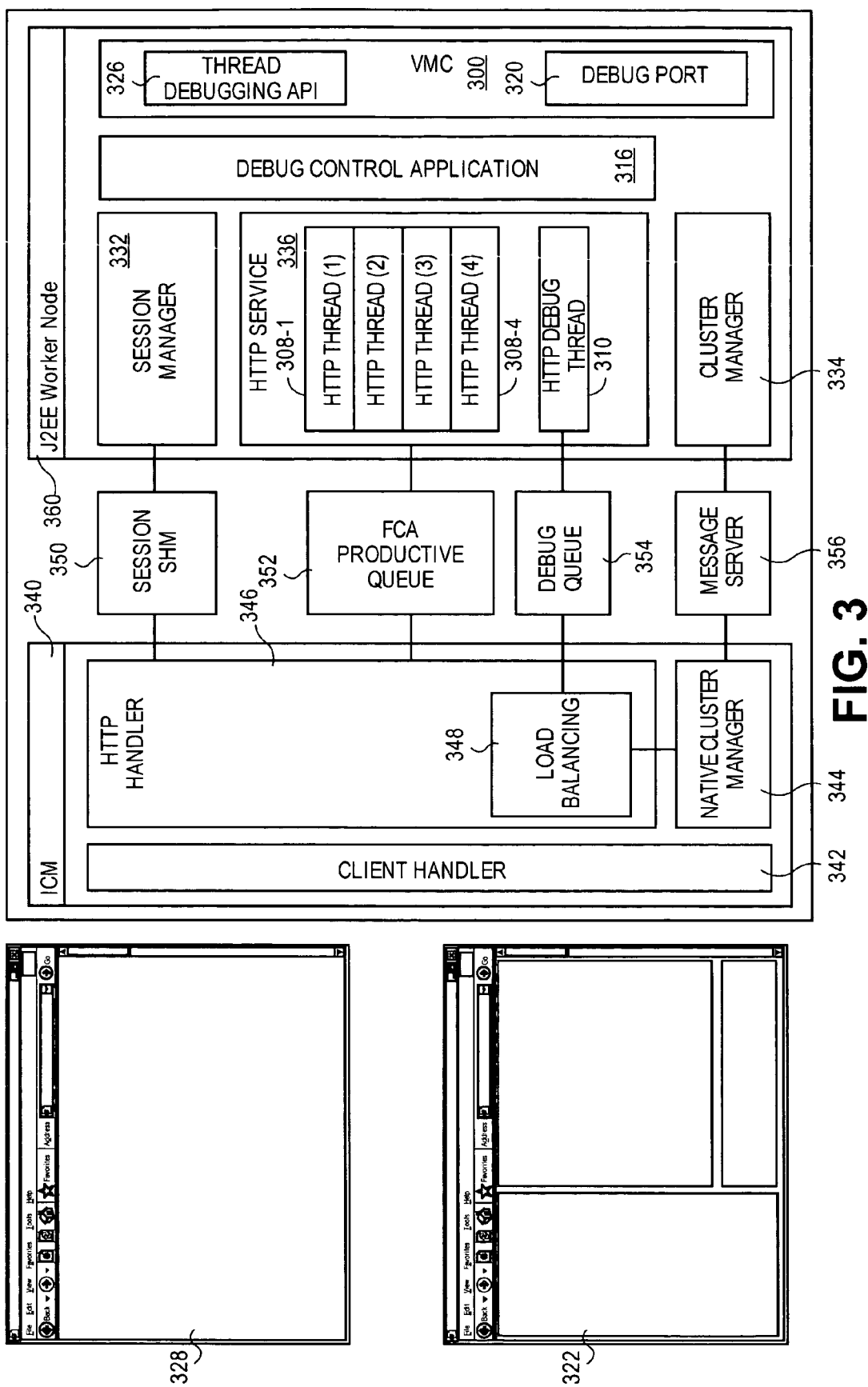
FIG. 3 is a block diagram of a system of one embodiment of the invention in a cluster environment.

FIG. 3 is a block diagram of a system of one embodiment of the invention in a cluster environment, as it might be used in a clustered environment. An internet connection manager (ICM) 340 manages the connections between the external clients not shown and worker nodes within the cluster, such as worker node 360. In one embodiment, worker node 360 may be a J2EE worker node. In some embodiments, worker node 360 may, for example, be a webserver node. ICM 340 includes a client handler 340 to handle incoming requests from external clients (not shown). Each request may be routed to a hypertext transfer protocol (HTTP) handler 346, which includes load balancing routine 348. Load balancing routine 348 may select an appropriate worker node to handle the request. Native cluster manager 344 ICM 340 passes cluster events to the HTTP handler 346 and in particular load balancing routine 348. In this manner, load balancing routine 348 becomes aware of the activity in the cluster and can appropriately balance incoming request between the nodes of the cluster.

The worker node 360 includes a session manager 332, which is responsible for updating stated information for the worker node 360 in the session shared memory 350. The session shared memory (SHM) 350 is attached to the corresponding session manager 332 and the HTTP handler 346. This permits the ICM 340 to be aware of the session state information by checking the shared memory 350. In one embodiment, a debugging flag 351 is set in session SHM 350 if the worker node 360 has a thread in debugging mode.

An HTTP service 336 may reside within the worker node 360 may include a number of productive threads, e.g., threads 308-1 through 308-4 and potentially one debug thread$_D$ 310. A cluster manager 334 may communicate over socket connections with the message server 356 to insure consistency within the cluster. Within worker node 360, the VMC 300 provides a thread debugging API 326 and a debug port 320 for a VM (not shown). In one embodiment, debug control application (DCA) 316 may be servlet inside the worker node and may use a Java API of a thread debugging API 326 to initiate thread debugging as needed. The DCA 316 is responsible for preparing the application debugging infrastructure on demand. For example, the DCA 316 may create the debug queue 354 and http debug thread 310. DCA 316 may also create a new session through session manager 332 and set the debug flag 351 in session shared memory 350. DCA may then send connection information to the client requesting a switch into debugging mode.

Productive threads 308-1 through 308-4 in HTTP service 336 communicate over a transport connection with productive queue 352. Productive queue 352 is a data structure, which holds client requests to be handled by the HTTP service in productive mode. Similarly, HTTP debug thread 310 communicates over a transport layer connection with debug queue 354. Debug queue 354 is a data structure holding client requests to be handled in the debug mode.

Debug client interface 322 may be an IDE interface to facilitate debugging as described in greater detail below. Browser 328 may be used by the debug client during debugging.

Figure 4:
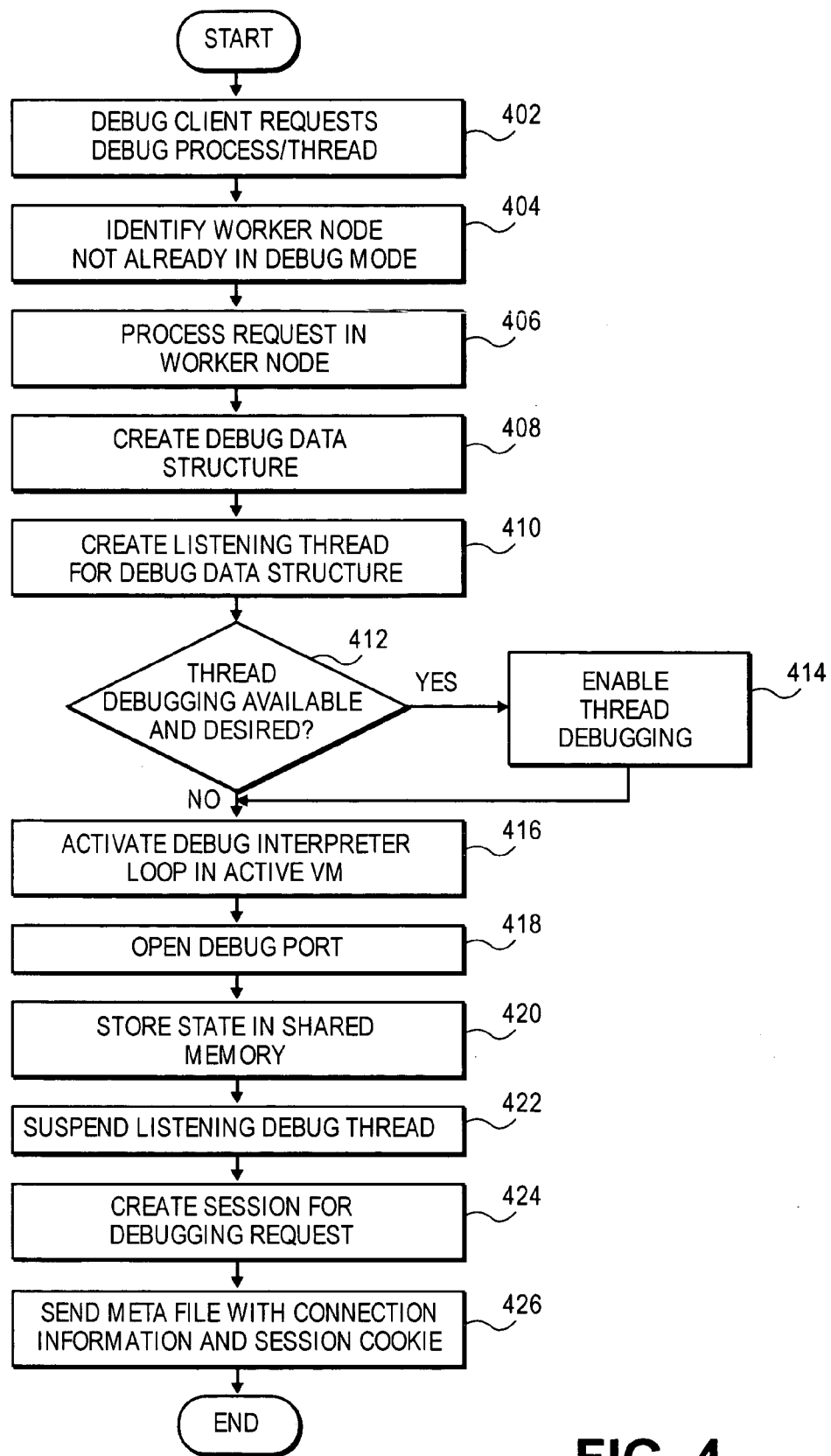
FIG. 4 is a flow diagram of activation of debugging mode in a system such as shown in FIG. 3.

FIG. 4 is a flow diagram of activation of debugging mode in a system such as shown in FIG. 3. At block 402, debug client requests a debug process or thread. For example, ID 322 may send such a request to client handler 342 of ICM 340. At block 404, a worker node not already in a debug mode is identified. For example, ICM 340 may check a load balancing list to identify a worker node not already in the debugging mode. Alternatively, ICM may check the process shared memory administration to discern what worker nodes are not currently in the debugging mode.

At block 406, the request for a debug processor thread is processed in the worker node. For example, the request may be put in productive queue 352 for a worker node not yet in debug mode and handled by, for example, HTTP thread 308-1. This request causes the worker node to create a debug data structure at block 408. In one embodiment, DCA 316 will create debug queue 354. In one embodiment, the debug queue follows the same naming convention as the productive queue differing only in an extension of the queue name, such as "_d." At block 410, a listening thread for the debug data structure is created. In one embodiment, DCA 316 creates a new debug thread 310 to listen to debug queue 354.

At decision block 412, a determination is made if thread debugging is available and desired. In some embodiments, thread debugging may not be available in other situations it may be undesirable to have thread debugging enabled where, for example, global debugging is desired. If thread debugging is desired and available, the system enables thread debugging at block 414. In one embodiment, DCA 316 uses Java API 326 of VMC 300 to switch on thread debugging for just created debug thread 310.

At block 416, debug interpreter loop is activated in an active VM. At block 418, the VM opens the debug port on the fly. At block 420, the state of VM including the debug port is stored in shared memory. As a result of the stored shared memory, debug port is visible to the Microsoft Management Console (MMC). At block 422, a listening debug thread is suspended. In one embodiment, the VMC 300 suspends HTTP debug thread 310 immediately after the debug port 320 is opened and the state is written to shared memory 350.

At block 424, a session is created for the debugging requests. In one embodiment, DCA 316 engages session manager 332 to create a new session. In one embodiment, the new session is sticky, insuring that all requests related to that session will be routed to the same worker node. Session manager 332 sets a debug flag in the session shared memory 350. Additionally, the session repeats a session cookie with the load balancing attributes for a sticky session.

At block 426, a metafile with connection information and the session cookie is sent back to the requesting client. In one embodiment, DCA 316 sends an extensible markup language (XML) file with the debugging connection information. Including, for example, the debug host, debug port, debug node and http/http sport as well as the session cookie back to the IDE with interface 322. A debug client may later inherit the cookie to browser 328.

Figure 5:
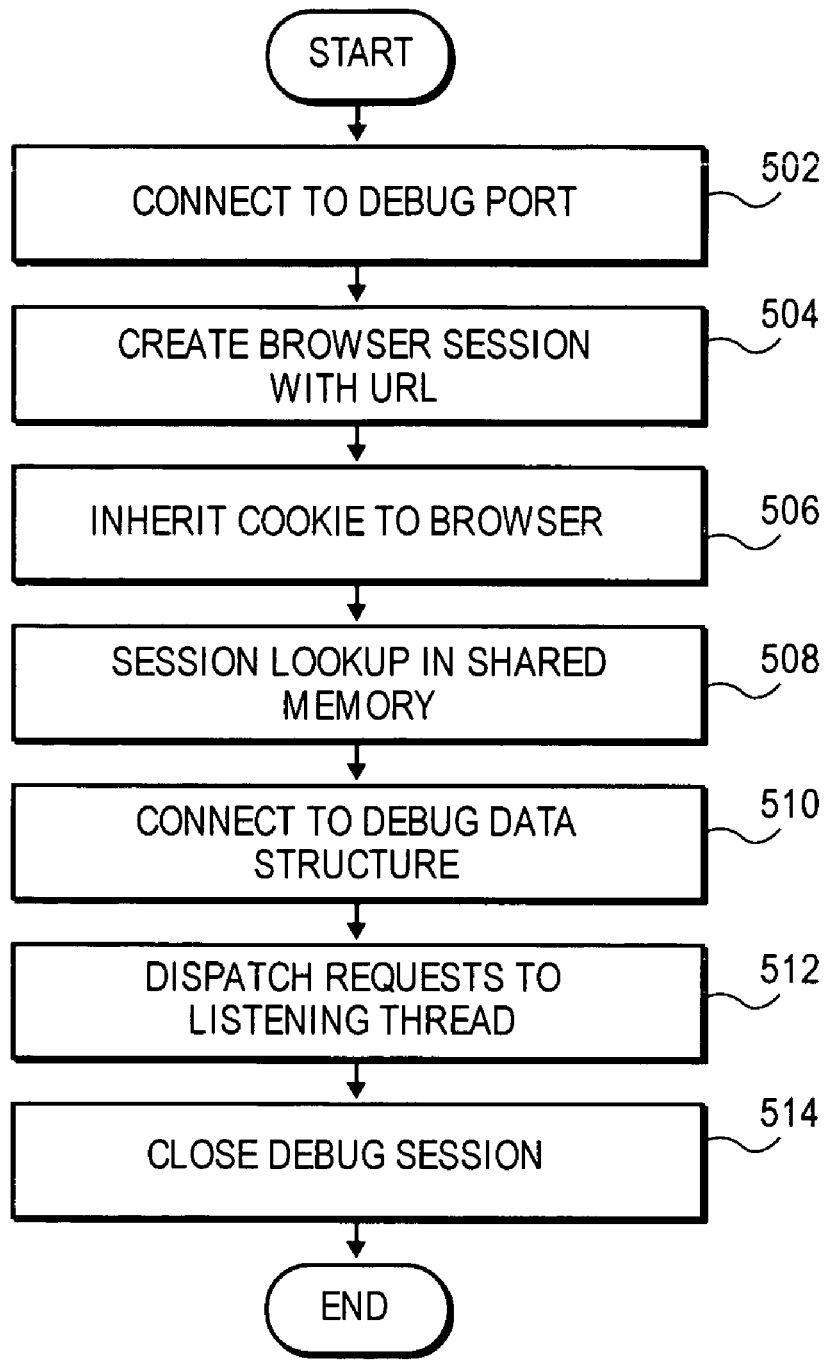
FIG. 5 is a flow diagram of operation while debugging is active in one embodiment of the invention such as shown in FIG. 3.

FIG. 5 is a flow diagram of operation while debugging is active in one embodiment of the invention as shown in FIG. 3. At block 502, the debug client connects to the debug port. In one embodiment, the debug client uses the information inside a connection metafile to connect to the correct debug port. In one embodiment, when thread debugging is active, the debug client will get only information about the thread, which is in the thread debugging mode. In this manner, thread debugging simulates a single thread application for the debug client. Additionally, commands sent by the debug client will be filtered so as not to affect other components within the worker node. In one embodiment, IDE uses the XML file passed by DCA 316 to connect to debug port 320.

At block 504, a debug client creates a browser session with a correct uniform resource locator (URL). Then at block 506, the debug client inherits the session cookie to the browser. In one embodiment, IDE creates browser session 328 and then inherits the cookie to browser 328.

At block 508, the existing session is looked up in shared memory and the debug flag previously set is detected. In one embodiment, browser 328 having inherited the session cookie, requests the session from the client handler 342 causing the ICM 340 to lookup the session in the session shared memory 350 where it will detect the debug flag for the session.

At block 510, a connection is established to the debug data structure. In one embodiment, ICM 340 connects to debug queue 354 and sends the request directly to the debug thread 310. The received requests are dispatched to a listening thread at block 512. Because, as previously noted, the debug queue 354 follows a standard naming convention with an _d extension dispatching in the ICM 340 is simplified.

At block 514, the debug session is closed. A debug session may be closed (i) by the debug client, (ii) because the debug session times out or (iii) because of invocation of the cleanup functionality for the debug session. The IDE may close a debug session by issuing a close event or by disconnecting from the debug port. Responsive to either occurrence, the VMC invokes registered cleanup functionality and closes the debug port. If the debug session times out, the session manager terminates the session. The session manager will then invoke the cleanup functionality and the Java API will disable thread debugging. In one embodiment, if debug cleanup functionality is invoked, it will close the debug queue, terminate the HTTP debug thread and remove the debug session from session management.

While embodiments of the invention are discussed above in the context of flow diagrams reflecting a particular linear order, this is for convenience only. In some cases, various operations may be performed in a different order than shown or various operations may occur in parallel. It should also be recognized that some operations described with respect to one embodiment may be advantageously incorporated into another embodiment. Such incorporation is expressly contemplated.

Elements of embodiments may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

The invention claimed is:

1. A client device comprising:
   a virtual machine (VM) to execute a first thread and a second thread, the first thread to trigger a debug event, the VM including
      a debug interpreter loop to provide debug mode execution, wherein the first thread is executed via the debug interpreter loop,
      a productive interpreter loop to provide optimized execution, wherein the second thread is executed, in parallel with the first thread, via the productive interpreter loop;
   a debug interface to couple the client device to a debut client, the debug interface to further
      transmit the debug event to the debug client,
      receive a debugging command from the debug client responsive to the debug event,
      determine whether the debug command affects the second thread,
      drop the debug command in response to determining the debug command affects the second thread, and
      execute the debug command in response to determining the debug command does not affect the second thread; and
   a switch logic coupled to the debut interface to switch execution of the first thread from debug mode execution to optimized execution based on dropping or executing the debug command.

2. The client device of claim 1 wherein the debug interface includes identification logic to identify if a command is thread specific.

3. The client device of claim 1 wherein the debug interface includes a data structure to hold a list of threads to drop debug commands received from the debug client.

4. The client device of claim 1 wherein the debug interface comprises includes forwarding logic to forward the commands for application to the first thread.

5. The client device of claim 1 wherein the VM further includes debug mode switch logic to switch between a global debug mode and a thread specific debug mode.

6. A computer-implemented method comprising:
   entering a debugging mode for a first thread, the debugging mode to include executing the first thread via a debugging interpreter loop included in a virtual machine (VM), the first thread to trigger a debut event, the debugging interpreter loon to provide debug mode execution of the first thread, the VM to further include
      a productive interpreter loop to provide optimized execution, and
      a debug interface to couple the VM to a debut client;
   executing a second thread, in parallel with the first thread, via the productive interpreter loop;
   transmitting the debug event to the debut client;
   receiving a debug command from the debug client responsive to the debug event via the debug interface;
   determining whether the debug command affects the second thread;
   dropping the debug command in response to determining the debug command affects the second thread;
   executing the debug command in response to determining the debug command does not affect the second thread; and
   switching execution of the first thread from debug mode execution to optimized execution based on dropping or executing the debug command.

7. The method of claim 6 wherein dropping the debug command in response to determining the debug command affects the second thread includes:
   dropping the command if it is a global debugging command; and
   dropping the command if it is directed to a thread executing in a productive mode.

8. The method of claim 6 wherein determining whether the debug command affects the second thread includes determining whether the debug command is thread specific.

9. The method of claim 6 wherein entering the debugging mode comprises:
   switching from optimized execution to debug mode execution for the first thread individually.

10. The method of claim 9 wherein switching comprises:
    changing from applying a productive interpreter loop to applying a debugging interpreter loop to the first thread within the VM.

11. A machine-accessible storage medium containing instructions that, when executed, cause a machine to:
    enter a debugging mode for a first thread, the debugging mode to include executing the first thread via a debugging interpreter loop included in a virtual machine (VM), the first thread to trigger a debug event, the debugging interpreter loop to provide debug mode execution of the first thread, the VM to further include a productive interpreter loop to provide optimized execution, and a debug interface to couple the VM to a debug client;

execute a second thread, in parallel with the first thread, via the productive interpreter loop;

transmit the debug event to the debug client;

receive a debug command from the debut client responsive to the debug event via the debug interface;

determine whether the debug command affects the second thread;

drop the debug command in response to determining the debug command affects the second thread;

execute the debug command in response to determining the debug command does not affect the second thread; and switch execution of the first thread from debug mode execution to optimized execution based on dropping or executing the debut command.

12. The machine-accessible storage medium of claim 11 wherein instructions causing the machine to drop the debug command in response to determining the debug command affects the second thread include instructions to cause the machine to:

drop the command if it is a global debugging command; and drop the command if it is directed to a thread executing in a productive mode.

13. The machine-accessible storage medium of claim 11 wherein instructions causing the machine to determine whether the debug command affects the second thread includes instructions to cause the machine to:

identify if the command is thread specific.

14. The machine-accessible storage accessible medium of claim 11 wherein instructions causing the machine to enter the debugging mode comprise instructions to cause the machine to:

switch from a productive mode to the debugging mode for the first thread individually.

15. The machine-accessible storage medium of claim 11 wherein instructions causing the machine to enter comprise instructions to cause the machine to:

change from applying a productive interpreter loop to applying a debugging interpreter loop to the first thread within the VM.

* * * * *

UNITED STATES PATENT AND TRADEMARK OFFICE
CERTIFICATE OF CORRECTION

PATENT NO. : 7,617,487 B2 Page 1 of 1
APPLICATION NO. : 11/011541
DATED : November 10, 2009
INVENTOR(S) : Kilian et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1039 days.

Signed and Sealed this

Fourteenth Day of December, 2010

David J. Kappos
*Director of the United States Patent and Trademark Office*